United States Patent
Tian et al.

(10) Patent No.: US 9,396,741 B1
(45) Date of Patent: Jul. 19, 2016

(54) DATA WRITER SIDE SHIELD WITH CANTILEVERED PROTRUSIONS

(71) Applicant: Seagate Technology LLC, Cupertino, CA (US)

(72) Inventors: Wei Tian, Eden Prairie, MN (US); XiaoHong Zhang, Eden Prairie, MN (US); Joseph M. Mundenar, Eden Prairie, MN (US); Dong Lin, Eden Prairie, MN (US); Jia Sun, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/839,558

(22) Filed: Aug. 28, 2015

(51) Int. Cl.
G11B 5/11 (2006.01)
G11B 5/31 (2006.01)

(52) U.S. Cl.
CPC .............. G11B 5/315 (2013.01); G11B 5/3163 (2013.01)

(58) Field of Classification Search
CPC .... G11B 5/1278; G11B 5/3116; G11B 5/315; G11B 5/3163; G11B 5/11
USPC ...................................................... 360/125.3
See application file for complete search history.

(56) References Cited

U.S. PATENT DOCUMENTS

| 6,884,148 B1 | 4/2005 | Dovek et al. | |
| 7,768,743 B2 | 8/2010 | Guthrie et al. | |
| 7,872,835 B2 * | 1/2011 | Guan | G11B 5/3116 360/319 |
| 7,894,159 B2 * | 2/2011 | Lengsfield, III | G11B 5/11 360/125.03 |
| 7,995,307 B2 | 8/2011 | Zheng | |
| 8,035,930 B2 | 10/2011 | Takano et al. | |
| 8,139,320 B2 | 3/2012 | Hsiao et al. | |
| 8,233,236 B2 * | 7/2012 | Kim | G11B 5/3116 360/125.16 |
| 8,400,731 B1 | 3/2013 | Li et al. | |
| 8,472,141 B2 | 6/2013 | Gao et al. | |
| 8,488,272 B1 * | 7/2013 | Tran | G11B 5/1278 360/125.08 |
| 8,564,906 B2 | 10/2013 | Gao et al. | |
| 8,792,208 B1 | 7/2014 | Liu et al. | |
| 8,797,686 B1 | 8/2014 | Bai et al. | |
| 8,929,027 B1 * | 1/2015 | Sugiyama | G11B 5/3116 360/125.01 |
| 8,970,992 B2 * | 3/2015 | Benakli | G11B 5/3116 360/319 |
| 9,042,051 B2 | 5/2015 | Zeng et al. | |
| 9,082,425 B2 | 7/2015 | Lopusnik et al. | |
| 2009/0091861 A1 * | 4/2009 | Takano | G11B 5/1278 360/319 |

* cited by examiner

*Primary Examiner* — Will J Klimowicz
(74) *Attorney, Agent, or Firm* — Hall Estill Attorneys at Law

(57) ABSTRACT

A data writer can be fabricated by constructing a write pole to continuously extend from an air bearing surface prior to depositing a first gap layer to continuously extend from the ABS in contact with a first write pole sidewall. A first side shield protrusion can then be formed on the air bearing surface to be separated from the write pole by the first gap layer. A second gap layer may be deposited to continuously extend from the first side shield protrusion along the first write pole sidewall to define a dielectric region on which a second side shield protrusion is formed with the second side shield protrusion separated from the write pole by the first and second gap layers and the first and second side shield protrusions each cantilevered from a common side shield body.

20 Claims, 4 Drawing Sheets

DATA WRITER SIDE SHIELD WITH CANTILEVERED PROTRUSIONS

SUMMARY

A data writer, in accordance with some embodiments, has a write pole that continuously extends from an air bearing surface and a first gap layer that continuously extends from the air bearing surface in contact with a first write pole sidewall. A first side shield protrusion is positioned on the air bearing surface and is separated from the write pole by the first gap layer. A second gap layer continuously extends from the first side shield protrusion along the first write pole sidewall to define a dielectric region on which a second side shield protrusion is formed with the second side shield protrusion separated from the write pole by the first and second gap layers and the first and second side shield protrusions each cantilevered from a common side shield body.

DETAILED DESCRIPTION

With data density, data reading rates, and data writing rates continuing to grow at a fast pace, the physical size, tolerance, and proximity of components in a data writer continue to miniaturize. Such reduced physical dimensions can result in the inadvertent alteration of data bits on a data track (on-track erasure) and/or on adjacent data tracks (off-track erasure). While data writer shields can be separated from a write pole portion of a data writer to reduce the risk of erasure conditions, the magnetic extent of the data writer may be too large to write data in a high data bit density data storage environment. Hence, there is a continued interest in providing a data writer with a reduced physical size that provides a balance of shielding and reduced risk of erasure conditions.

Accordingly, a data writer side shield can be configured with multiple protrusions separated by a non-magnetic gap with a tuned size, such as less than 10 nanometers. However, such a small non-magnetic gap feature can be difficult to construct with conventional fabrication processes. Thus, a write pole can be separated from a first cantilevered side shield protrusion by one dielectric gap layer and from a second cantilevered side shield protrusion by two dielectric gap layers with one gap layer continuously extending to fill a region separating the protrusions along a direction parallel to an air bearing surface (ABS).

Figure 1:
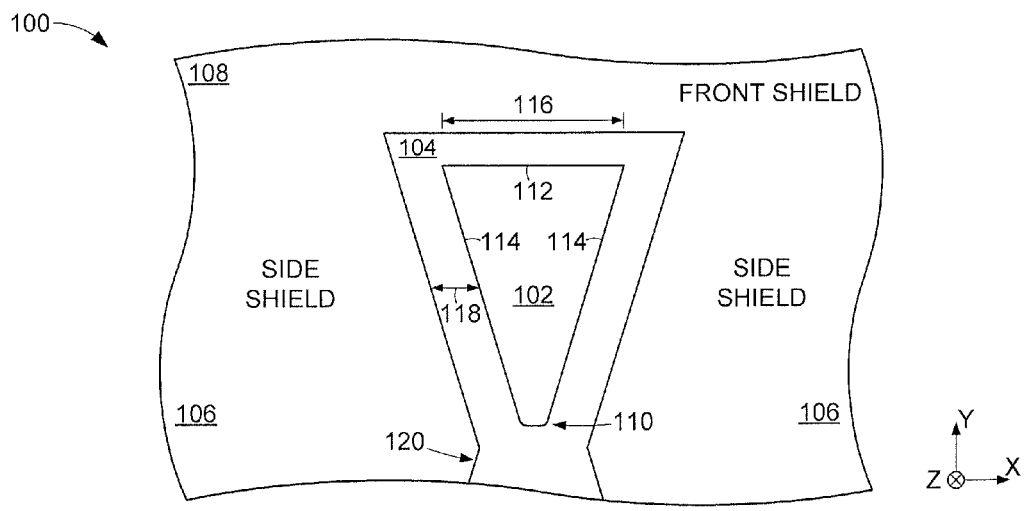
FIG. 1 is a block representation of a portion of an example data storage system configured in accordance with various embodiments.

FIG. 1 is an air bearing view line representation of a portion of an example data writer 100 arranged in accordance with various embodiments. The data writer 100 may be incorporated into a transducer head that consists of other data storage components, such as a magnetoresistive data reader, that operate to sense data bits stored on a rotating data storage medium. The data writer 100 has a write pole 102 surrounded by a non-magnetic gap material 104 that separates the magnetic material of the write pole 102 from the soft magnetic material of side 106 and front 108 shields. It is contemplated that the write pole 102 is constructed of $Fe_{1-x}Co_x$ and the side 106 and front 108 shields are respectively constructed of $Co_xNi_yFe_{1-x-y}$.

Although not required or limiting, the write pole 102 is shaped as a trapezoid that provides an uptrack leading tip 110 and a downtrack trailing edge 112 connected by tapered sidewalls 114. As data density in data storage devices increases, the angle of the respective sidewalls 114 has increased to make the trailing edge 112 longer and the leading tip 110 more severe. Such increased lateral write pole 102 width 116 at the trailing edge 112 can correspond with unwanted data erasure conditions as magnetic flux is directed away from a data bit along downtrack (Y axis) and/or cross-track (X-axis) directions to produce on-track erasure, off-track erasure, and adjacent track interference (ATI).

It is contemplated that the increased write pole width 116 heightens the chances for inadvertent shunting with an adjacent magnetic shield, which can transport magnetic flux across several different data tracks. A reduction in the amount of magnetic shielding material proximal the leading tip 110 of the write pole 102 has conventionally been a mechanism for reducing magnetic shield saturation and risk of erasure conditions. However, the decrease in the size 118 of the gap material, such as 100 nm or less, has rendered the uptrack non-magnetic material less effective.

Figure 2:
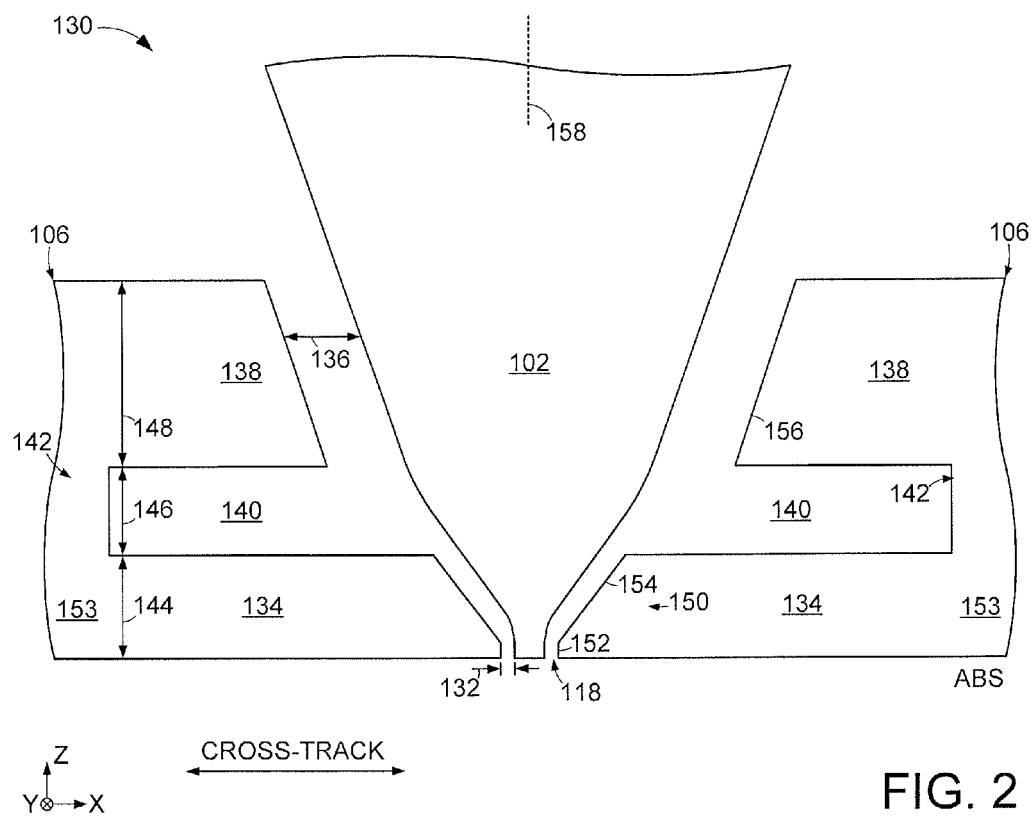
FIG. 2 illustrates a cross-sectional block representation of a portion of an example data writer configured in accordance with some embodiments.

FIG. 2 illustrates a top view line representation of a portion of an example data writer 130 arranged in accordance with some embodiments to provide a balance of small physical dimensions, shielding capability, and risk of erasure. The top view of FIG. 2 shows how the gap size 118 can be a first distance 132 on the ABS between the write pole 102 and a first cantilevered protrusion 134 and a greater second distance 136 between the write pole 102 and a second cantilevered protrusion 138. The increased second gap distance distal the ABS can complement the non-magnetic gap region 140 to provide ample shielding without increasing risk of erasure on the ABS.

Each protrusion 134 and 138 continuously extends from a common shield body 153 that allows stray magnetic fields to be efficiently dissipated. It is contemplated that the thickness of the respective cantilevered protrusions 134 and 138 as well as the non-magnetic gap region 140 can be tuned to optimize the performance of the shield 106 and write pole 102. That is, a first protrusion thickness 144, as measured perpendicular to the ABS and parallel to the Z axis, can be the same, or different, than second 146 and third 148 thicknesses of the gap region 140 and second protrusion 134, respectively. By tuning the various thicknesses 144, 146, and 148, the shielding characteristics of the side shield 106 and the risk of unwanted shunting at the ABS can be mitigated.

As shown, but in no way required or limiting, the first cantilevered protrusion 134 has a write pole facing feature 150 consisting of a substantially vertical sidewall 152 that is perpendicular to the ABS and a tapered sidewall 154 that is angled with respect to the ABS. The write pole facing feature 150 can be configured to match the shape and size of the write pole tip 110 along some, or all, of the protrusion's thickness 144. The second cantilevered protrusion 138 has a write pole facing surface 156 that is continuously linear, but may be partially or completely curvilinear in some embodiments. The ability to tune the shape, size, and position of the write pole facing feature 150 and surface 156 allows the respective protrusions 134 and 138 to provide a balance between shielding and mitigated shunting risk.

It is contemplated that the second cantilevered protrusion 138 is configured to promote shunting from the write pole 102 in an effort to reduce shunting on the ABS, which corresponds with erasure conditions. That is, the second cantilevered protrusion 138 can serve as a lightning rod, of sorts, that reduces the risk of side shield 106 shunting and magnetic saturation on the ABS. It is also contemplated that the respective side shields 106 are configured differently. For instance, the side shields 106 can be asymmetric about the longitudinal axis 158 that bisects the write pole 102 parallel to the Z axis to provide asymmetric shielding characteristics along a cross-track direction.

Although the configuration of the side shield 106 can be theoretically tuned to a variety of arrangements, the physical construction of such a side shield can be difficult, particularly with the side shield having angstrom scale dimensions. For instance, providing different thicknesses 144, 146, and 148 as well as different gap distances between the write pole 102 and cantilevered protrusions can be challenging with sputtering and vapor deposition techniques having tolerances on an angstrom scale.

Figure 3:
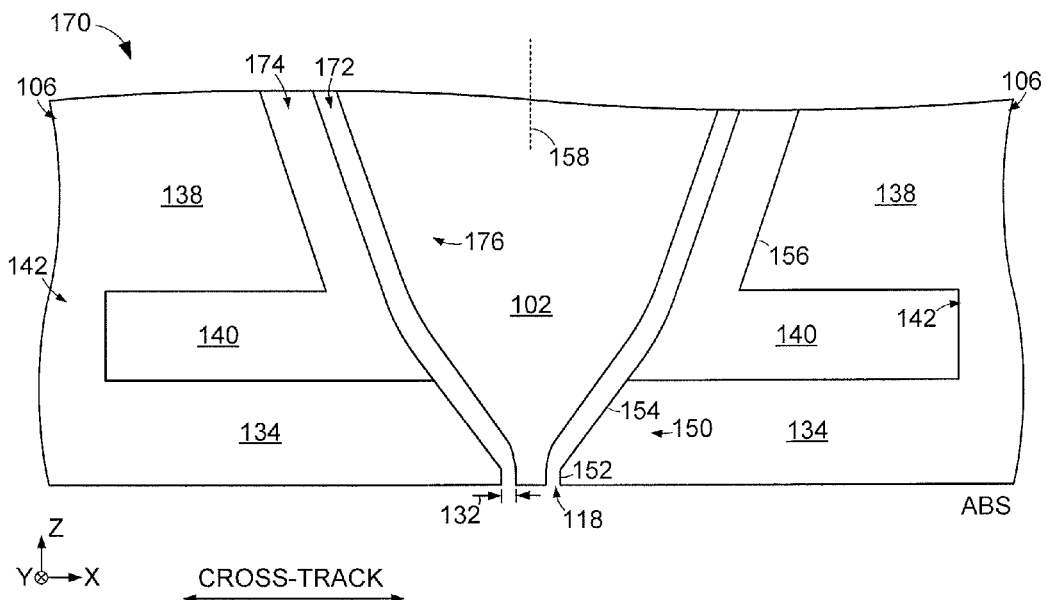
FIG. 3 shows a cross-sectional block representation of a portion of an example data writer arranged in accordance with various embodiments FIGS. 4A-4C display a cross-sectional block representation of a portion of an example data writer configured in accordance with assorted embodiments.

FIG. 3 provides a top view line representation of a portion of an example data writer 170 configured to provide reduced physical dimensions and more accurate fabrication via conventional film deposition lithography. First 172 and second 174 gap layers are utilized to individually and collectively separate the first 134 and second 138 protrusions while filling the gap region 140. The use of separate gap layers 172 and 174 allows the write pole 102 separation distances to be more precisely controlled without inducing complex or time consuming fabrication techniques.

As shown, each gap layer 172 and 174 continuously extends along a write pole body 176 to the write pole tip 110 towards the ABS. The first gap layer 172 continuously extends to contact the ABS while the second gap layer 174 fills the gap region 140 and is separated from the ABS. The ability to individually deposit the respective gap layers 172 and 174 allows the gap layer thicknesses to be controlled so that the cantilevered protrusions 134 and 138 are positioned in accordance with design specification despite the gap distance 118 being small, such as less than 1 angstrom. Even with the use of different gap layers 172 and 174, which may be similar or dissimilar materials, construction of the gap region 140 can be difficult.

Figure 4A:
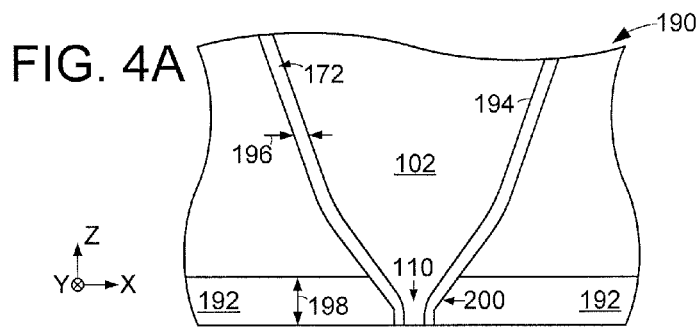
Figure 4B:
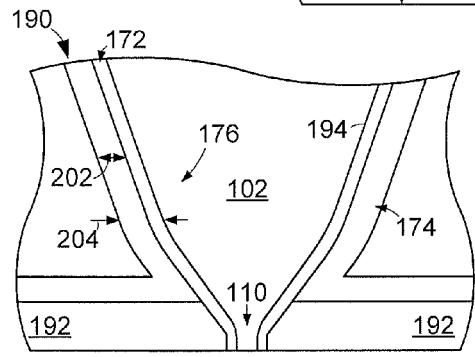
Figure 4C:
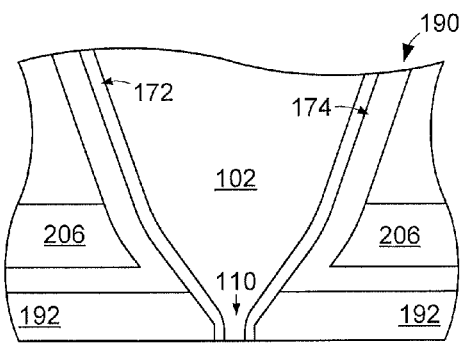

FIGS. 4A-4C respectively display top view line representations of a portion of an example data writer 190 constructed in accordance with some embodiments over time to be efficiently and accurately fabricated on a nanometer scale. FIG. 4A depicts how a first side shield layer 192 can be formed on the ABS and separated from a tip portion 110 of the write pole 102 by the first non-magnetic gap layer 172 that continuously contacts a sidewall 194 of the write pole 102 and has a uniform width 196. It is noted that a number of steps, techniques, and processes can be utilized to shape the first shield layer 192 with a uniform or varying thickness 198 and a pole facing feature 200.

FIG. 4B illustrates how a second gap layer 174 can be deposited to continuously extend along the write pole body sidewall 194 and the first side shield layer 192. The second gap layer 174 may have a uniform or varying width 202 along its length, such as proximal the first side shield layer 192. The deposition of the second gap layer is tuned to provide a collective gap width 204 proximal the write pole body 176 that defines the separation distance between the second side shield cantilevered protrusion and the write pole 102. It is noted that the width 196 of the first gap layer 172 solely defines the separation distance between the write pole 102 and the first side shield cantilevered protrusion provided by the first side shield layer 192 and the collective width 204 of the first 172 and second 174 gap layers separates the second side shield cantilevered protrusion from the write pole 102, as shown in FIG. 4C.

The deposition of the second gap layer 174 atop the first side shield layer 192 allows the shape and size of the gap region 140 to be more efficiently and accurately constructed compared to lateral etching and fill techniques. As a non-limiting example, the second gap layer 174 may be patterned prior to deposition of the second side shield layer 206 to define a rectangular, triangular, or curvilinear gap region 140 shape. In some embodiments, the gap region 140 has a greater size proximal the write pole 102 and a smaller size distal the write pole 102 to allow greater side shield volume to efficiently dissipate stray magnetic fields.

Figure 5A:
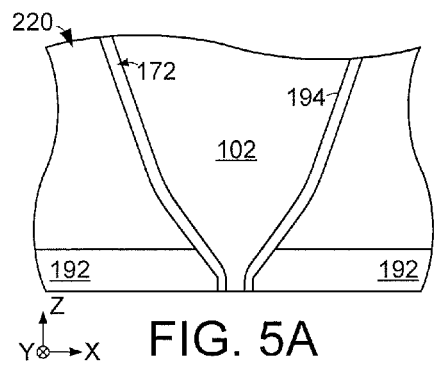
FIGS. 5A-5D provide a cross-sectional block representation of a portion of an example data writer constructed and operated in accordance with some embodiments.
Figure 5B:
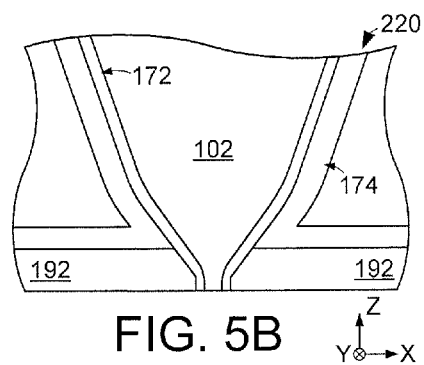

While shaping the gap region 140 is theoretically possible, accurate patterning and/or configuring of the second gap layer 174 can be difficult when the second gap layer width 202 is small, such as less than 10 Angstroms. FIGS. 5A-5D respectively are top view line representations of portions of an example data writer 220 arranged in accordance with various embodiments over time to accurately shape a gap region 140 despite small side shield 106 physical dimensions. FIGS. 5A and 5B respectively mirror FIGS. 4A and 4B where first 172 and second 174 gap layers are successively deposited to be in contact with the write pole 102 and first side shield layer 192.

Figure 5C:
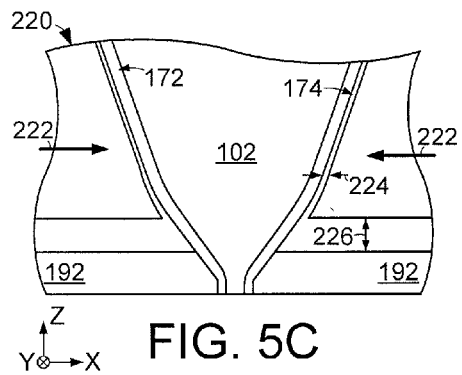

FIG. 5C illustrates how a lateral dryetch process 222 removes portions of the second gap layer 174 from the write pole sidewall 194 and re-deposits the material atop the first side shield layer 192. By locating an ion beam parallel to the ABS and the cross-track direction, as shown by solid arrow 222, the second gap layer 174 is effectively thinned on the write pole sidewall 194 and thickened atop the first shield layer 192. The lateral dryetch process 222 can be static or dynamic by moving relative to the ABS. The lateral dryetch process may also be tuned to remove less than all the second gap layer 174 from the write pole sidewall 194. That is, the lateral dryetch process can be tuned for power and time to reduce, or eliminate, the second gap layer width 224 on the write pole sidewall 194 and concurrently increase the thickness 226 of the gap region 140. It is noted that the lateral dryetch process 222 can tune the separation distance of the second side shield cantilevered protrusion 138 and the write pole 102.

Figure 5D:
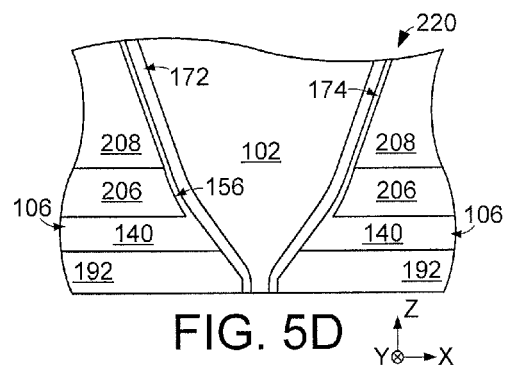

FIG. 5D displays an example re-deposited second gap layer 174 on which a second side shield layer 206 is formed with a second protrusion thickness 148. The data writer 220 of FIG. 5D shows how the lateral dryetch process 222 shapes both the pole facing surface 156 of the second cantilevered protrusion 138 and the gap region 140. It is contemplated that the second gap layer material is subsequently deposited on the second side shield layer 206 to fill the space 228 distal the ABS and write pole 102.

The ability to tune the shape, size, and position of the second gap layer 174 via one or more lateral dryetch processes 222 allows the data writer 220 to conform to a variety a design dimensions. For example, the respective separation distances between the first 134 and second 138 cantilevered protrusions and the write pole 102 as well as the gap region thickness 146 can range from tens to hundreds of nanometers. It is noted that the materials of the gap layers 172 and 174 is not limited, but can be dielectrics like $Al_2O_3$ and $SiO_2$ that are deposited via atomic layer deposition, chemical vapor deposition, sputtering, e-beam deposition, evaporation, and metal organic chemical vapor deposition.

Figure 6:
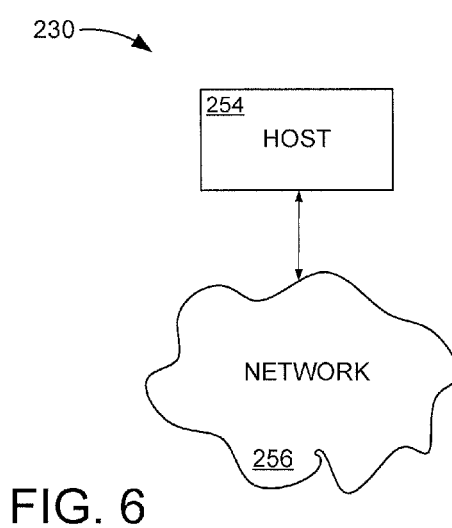
FIG. 6 displays a block representation of a portion of an example data storage system in which a tuned data reader can be commissioned in accordance with some embodiments.

FIG. 6 displays a block representation of a portion of an example data storage system 230 in which a tuned data reader can be commissioned in accordance with some embodiments. Although not required or limiting, the data storage system 230 can have one or more data storage devices 232 that are configured with at least one data storage means. It is contemplated that various solid-state volatile and non-volatile memories can be used as data storage means.

Assorted embodiments arrange at least one data storage device 232 of the data storage system 230 as a hard disk drive with at least one local controller 234 directing operations of a transducing assembly 236 that consists of a plurality of data bits 238 stored in various data track 240 portions of a data storage medium 242. One or more data bits 238 can be accessed individually, concurrently, and successively by a read head 244 that has a slider 246 suspended from an actuating assembly 248 to present data reader and data writer components. In operation, a spindle 250 can rotate the data storage medium 242 to produce an air bearing 252 on which the slider 246 flies, as directed by the actuating assembly 248 and controller 234.

While the data storage device 232 can operate solely with the local controller 234, various embodiments connect the data storage device 232 with at least one remote host 254 via a wired and/or wireless network 256. The remote connection of the data storage device 232 allows the remote host 254 to provide additional processing, data storage, and security capabilities without impinging on the operation of the data storage device 232. It is contemplated that the data storage system 230 can incorporated any number of data readers that are arranged to provide optimized side shield data reader biasing and shielding structures.

Figure 7:
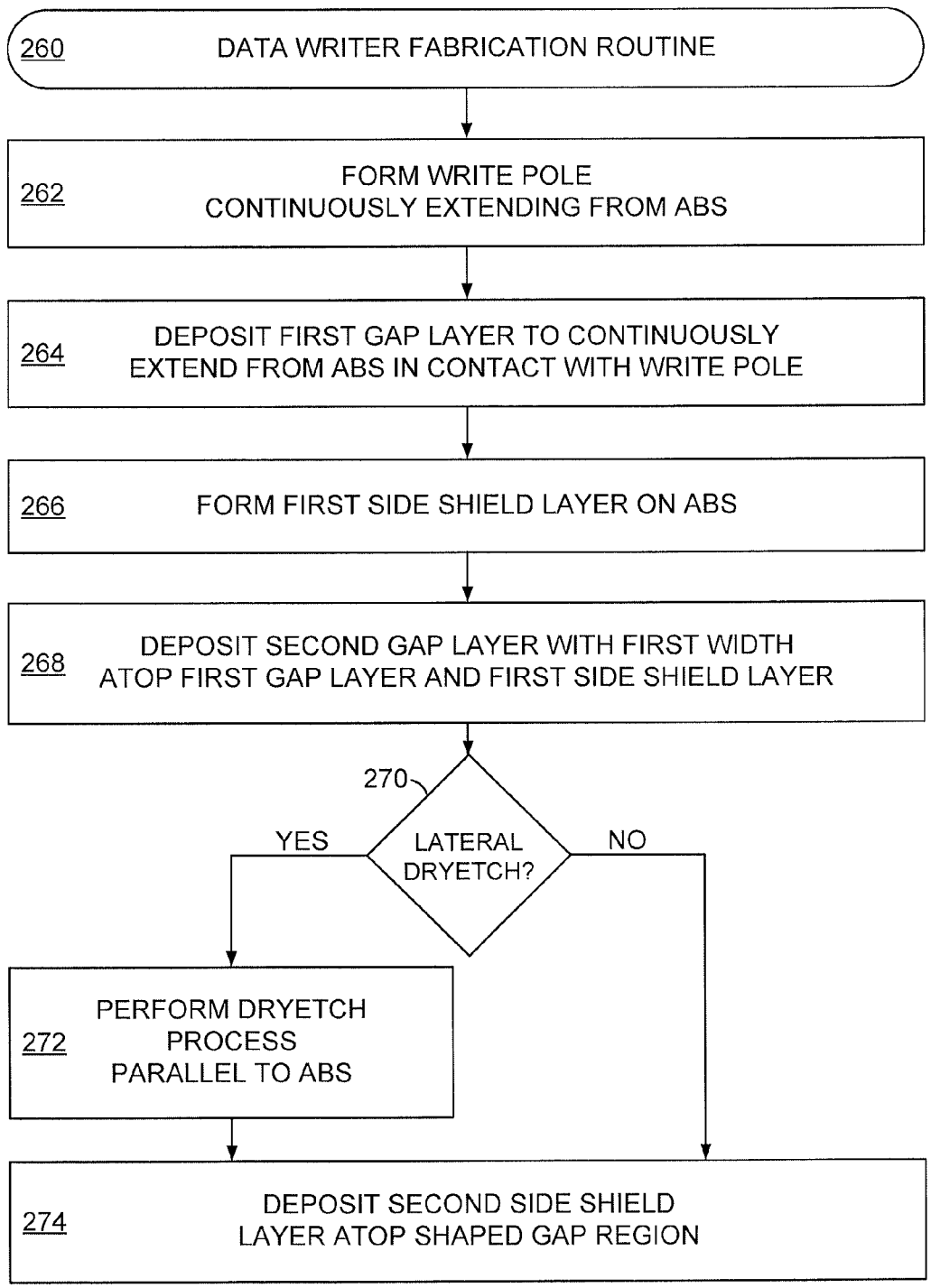
FIG. 7 is a flowchart of an example data writer fabrication routine carried out in accordance with various embodiments.

Although not required or limiting, FIG. 7 conveys an example data reader fabrication routine 260 carried out in accordance with various embodiments to construct a data reader tuned to a predetermined data storage environment. The routine 260 begins by form a write pole with a predetermined shape in step 262 starting with a write pole tip on an ABS and continuously extending to a write pole body distal the ABS. Step 262 can define at least a pair of write pole sidewalls that comprise one or more linear, or curvilinear, surfaces.

Next, step 264 deposits a first gap layer in contact with and continuously extending along each write pole sidewall from the ABS. The first gap layer can have a varying or uniform width. For example, the first gap layer can have a smaller width on the ABS than proximal the write pole body. The formation of the first gap layer sets the separation distance between the write pole and the first side shield layer formed in step 266. It is contemplated that the first side shield layer can have a uniform or varying thickness as well as a write pole facing feature, such as feature 150 of FIG. 2.

The first side shield layer and first gap layer are then buried by a second gap layer deposited in step 268 to continuously extend along the first side shield layer and the write pole sidewall. The second gap layer may have a uniform or varying width, as measured parallel to the ABS proximal the write pole body and perpendicular to the ABS proximal the first side shield layer. Decision 270 proceeds to evaluate if a lateral dryetch process is to be conducted. If so, step 272 performs a static or dynamic dryetch process with tuned power and timing from a direction parallel to the ABS to re-deposit portions of the second gap layer from a position proximal the write pole sidewall to a position proximal the first side shield layer.

At the conclusion of step 272, or in the event no lateral dryetch process is chosen in decision 270, step 274 deposits a second side shield layer atop the second gap layer. It is noted that the various aspects of routine 260 are not limiting or required. As such, the steps and decision of routine 260 can be changed or removed just as additional steps and decisions can be added. For example, an additional step can pattern the second gap layer to allow the first and second side shields to contact each other to form a side shield body distal the write pole.

It is noted that through the various embodiments of the present disclosure, a data writer can employ optimized side shields with reduced physical dimensions. The formation of first and second gap layers allows a side shield to be constructed with precise protrusion separation distances and gap region thickness. The ability to utilize lateral dryetching allows for intricate and accurate shaping of the gap region by re-depositing portions of the second gap layer from proximal the write pole body. With the ability to fabricate precise shield features and separation distances, modeled shield configurations can be accurately employed to optimize the operation of the data writer.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method comprising:
   constructing a write pole to continuously extend from an air bearing surface (ABS);
   depositing a first gap layer to continuously extend from the ABS in contact with a first write pole sidewall;
   forming a first side shield protrusion on the ABS, the first side shield protrusion separated from the write pole by the first gap layer;
   depositing a second gap layer continuously extending from the first side shield protrusion along the first write pole sidewall, the second gap layer defining a dielectric region;
   forming a second side shield protrusion on the dielectric region, the second side shield protrusion separated from the write pole by the first and second gap layers, the first and second side shield protrusions each cantilevered from a common side shield body.

2. The method of claim 1, wherein the first and second side shield protrusions are respectively separated from the write pole by different gap distances, as measured parallel to the ABS.

3. The method of claim 1, wherein the dielectric region has a rectangular shape and is separated from the write pole and ABS.

4. The method of claim 3, wherein the second gap layer continuously extends to fill the dielectric region.

5. The method of claim 3, wherein the first gap layer continuously extends from the ABS along a sidewall of the write pole.

6. The method of claim 1, wherein the common side shield body, first side shield protrusion, and second side shield protrusion are each electroplated.

7. The method of claim 1, wherein the first side shield protrusion has a first gap surface shaped to match a tip sidewall of the write pole and the second side shield protrusion has a second gap surface shaped to match a body sidewall of the write pole.

8. The method of claim 1, wherein the first and second shield protrusions are formed with different deposition techniques.

9. A method comprising:
constructing a write pole to continuously extend from an air bearing surface (ABS);
depositing a first gap layer to continuously extend from the ABS in contact with a first write pole sidewall;
forming a first side shield protrusion on the ABS, the first side shield protrusion separated from the write pole by the first gap layer;
depositing a second gap layer continuously extending from the first side shield protrusion along the first write pole sidewall;
creating a dielectric region by etching the second gap layer;
forming a second side shield protrusion on the dielectric region, the second side shield protrusion separated from the write pole by the first and second gap layers, the first and second side shield protrusions each cantilevered from a common side shield body.

10. The method of claim 9, wherein the etching is conducted parallel to the ABS.

11. The method of claim 9, wherein the etching is dry etching.

12. The method of claim 9, wherein the etching comprises an ion beam directed from first and second directions relative to the ABS, the first and second directions being perpendicular to one another.

13. The method of claim 9, wherein the etching redeposits less than all the second gap layer positioned proximal the first write pole sidewall to the dielectric region.

14. The method of claim 9, wherein the dielectric region has a varying thickness as measured perpendicular to the ABS.

15. The method of claim 9, wherein the first and second gap layers are different materials.

16. The method of claim 9, wherein the first and second gap layers have different widths as measured parallel to the ABS.

17. The method of claim 9, wherein the second gap layer is patterned prior to forming the second side shield protrusion to contact the first and second side shield protrusions at the common side shield body.

18. The method of claim 9, wherein a second write pole sidewall is separated from a third and fourth side shield protrusions, the third side shield protrusion positioned on the ABS.

19. An apparatus comprising a write pole separated from a first side shield on an air bearing surface (ABS), the first side shield comprising first and second side shield protrusions each cantilevered from a common side shield body, the first side shield protrusion positioned on the ABS and separated from the write pole by a first gap layer, the second side shield protrusion separated from the first side shield protrusion by a dielectric region and from the write pole by first and second gap layers.

20. The apparatus of claim 19, wherein a second side shield is separated from the write pole on the ABS, the first and second side shields being symmetric about a longitudinal axis that extends from the ABS to bisect the write pole.

* * * * *